Figure 1:

W. K. QUEEN & T. F. PICKETT.
RECEIVER FOR ELECTROMECHANICAL TELEGRAPH SYSTEMS.
APPLICATION FILED JULY 10, 1912.

1,068,076.

Patented July 22, 1913.

7 SHEETS—SHEET 1.

WITNESSES:
E. B. Tomlinson
Patrick J. Conroy

INVENTORS:
Walter K. Queen
Thornton F. Pickett
by Browne & Woodworth
attys.

W. K. QUEEN & T. F. PICKETT.
RECEIVER FOR ELECTROMECHANICAL TELEGRAPH SYSTEMS.
APPLICATION FILED JULY 10, 1912.

1,068,076.

Patented July 22, 1913.

7 SHEETS—SHEET 2.

W. K. QUEEN & T. F. PICKETT.
RECEIVER FOR ELECTROMECHANICAL TELEGRAPH SYSTEMS.
APPLICATION FILED JULY 10, 1912.

1,068,076.

Patented July 22, 1913.

7 SHEETS—SHEET 3.

W. K. QUEEN & T. F. PICKETT.
RECEIVER FOR ELECTROMECHANICAL TELEGRAPH SYSTEMS.
APPLICATION FILED JULY 10, 1912.
1,068,076.
Patented July 22, 1913.
7 SHEETS—SHEET 4.
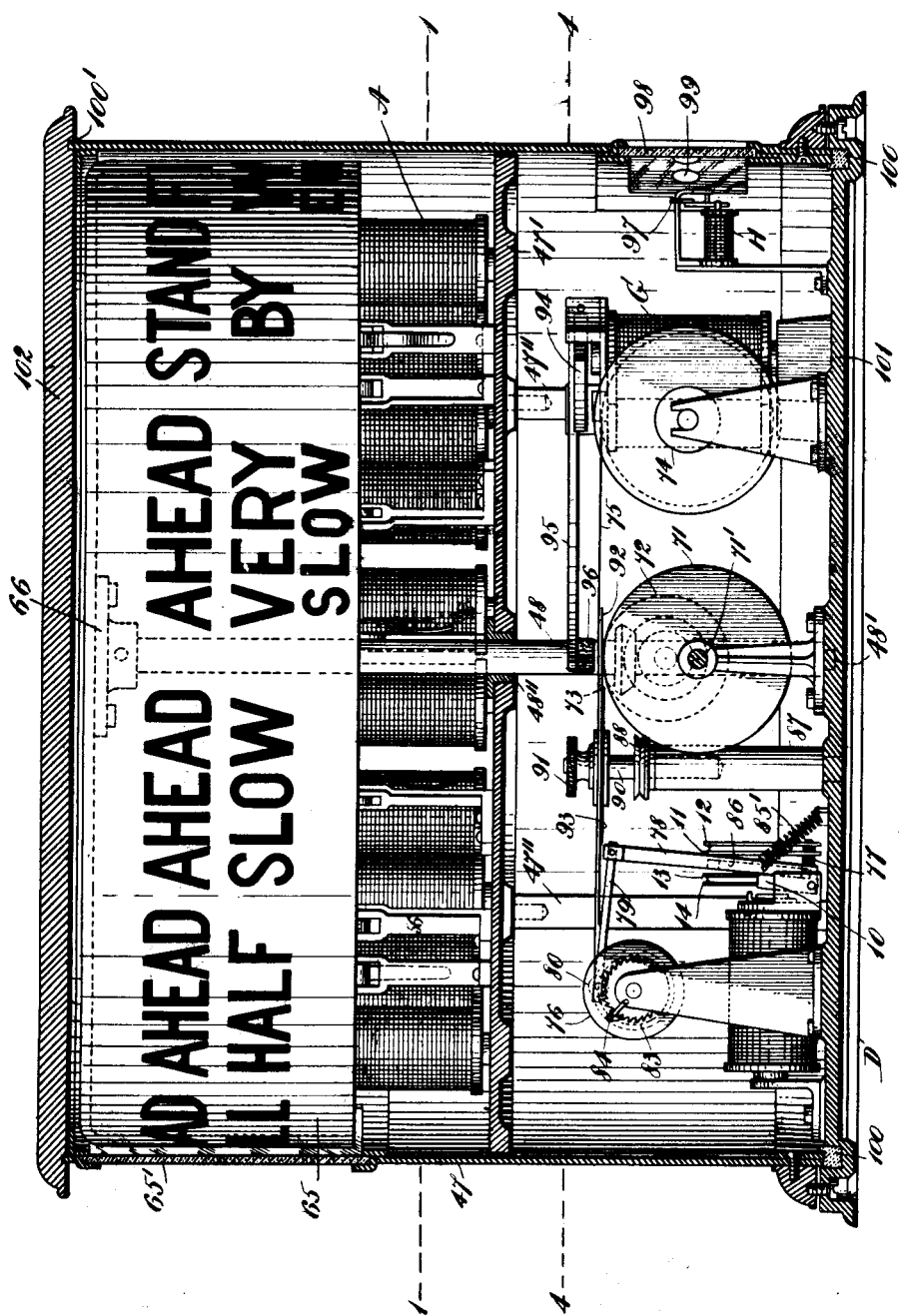

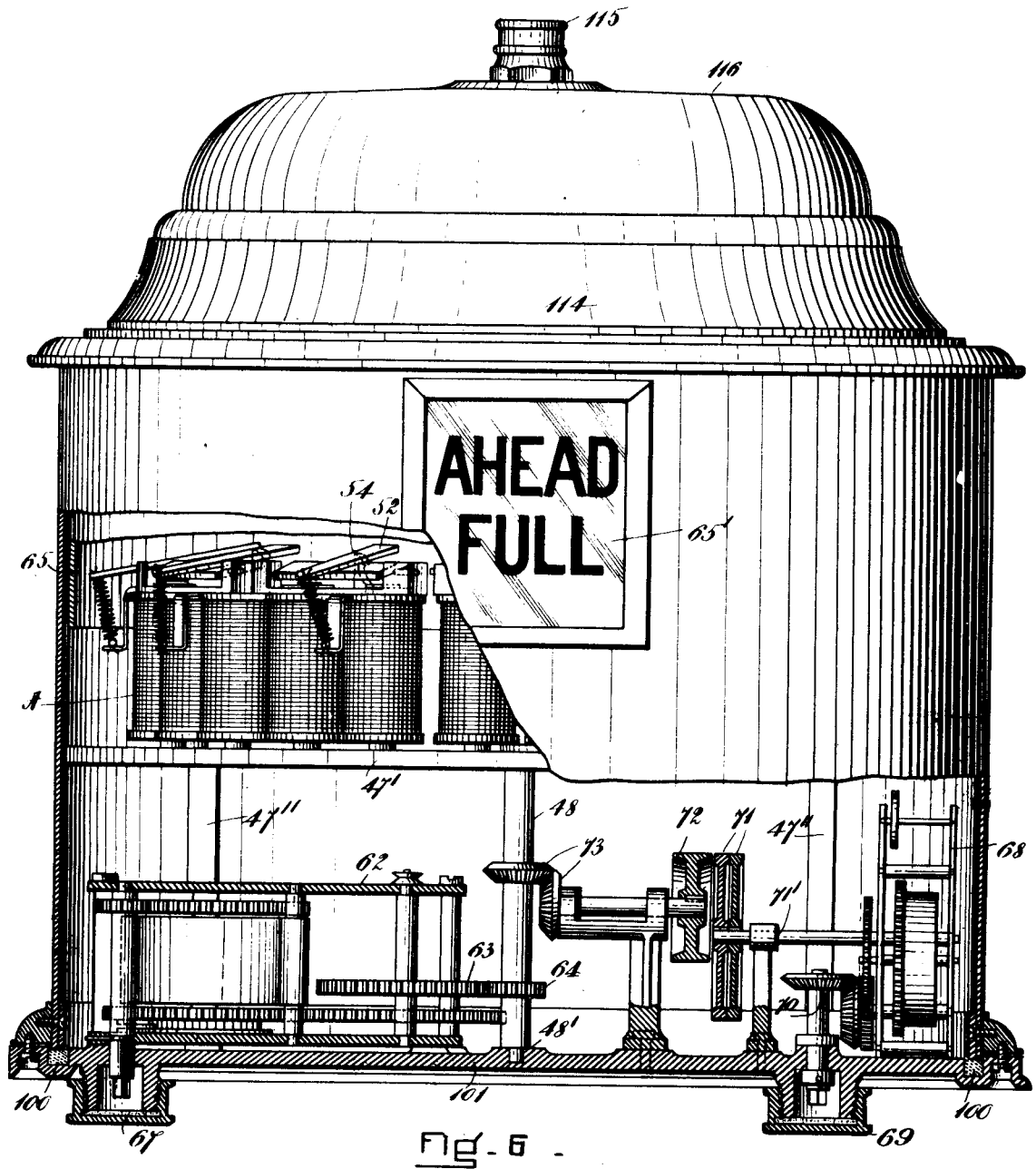

W. K. QUEEN & T. F. PICKETT.
RECEIVER FOR ELECTROMECHANICAL TELEGRAPH SYSTEMS.
APPLICATION FILED JULY 10, 1912.
1,068,076.
Patented July 22, 1913.
7 SHEETS—SHEET 6.
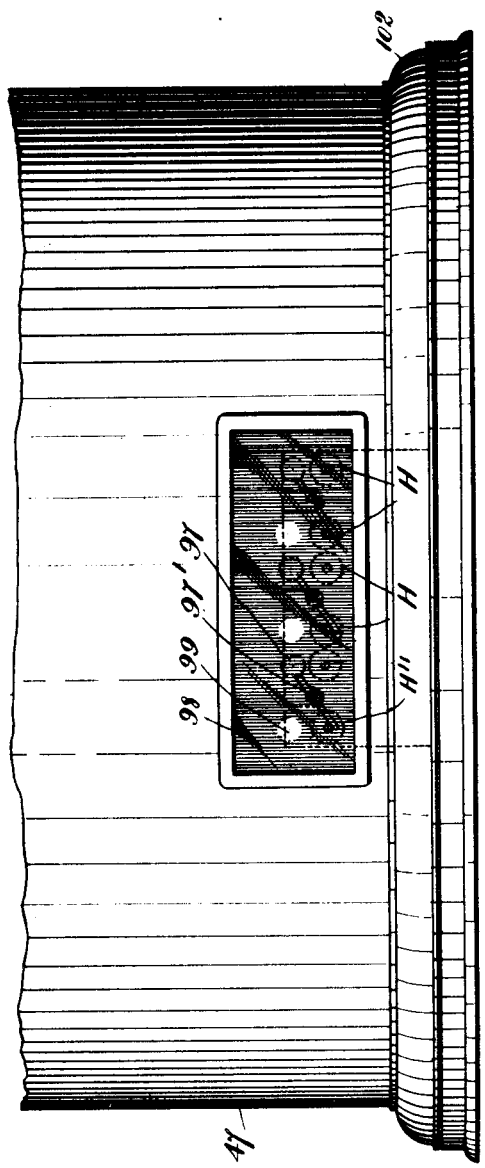
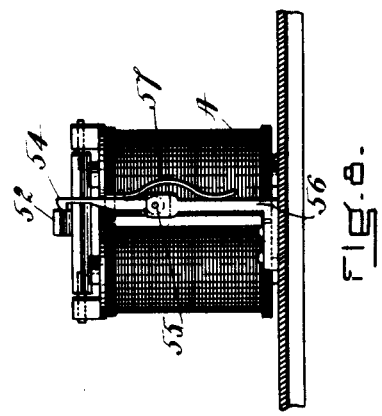

UNITED STATES PATENT OFFICE.

WALTER K. QUEEN AND THORNTON F. PICKETT, OF NEEDHAM HEIGHTS, MASSACHUSETTS.

RECEIVER FOR ELECTROMECHANICAL TELEGRAPH SYSTEMS.

1,068,076.  Specification of Letters Patent.  Patented July 22, 1913.

Original application filed June 17, 1910, Serial No. 567,470. Divided and this application filed July 10, 1912. Serial No. 708,650.

*To all whom it may concern:*

Be it known that we, WALTER K. QUEEN and THORNTON F. PICKETT, a citizen of the United States and a subject of the King of England, respectively, and residents of Needham Heights, county of Norfolk, and State of Massachusetts, have invented a new and useful Improvement in Receivers for Electromechanical Telegraph Systems, of which the following is a specification.

Our invention relates to electro-mechanical telegraph systems, and more especially to receivers for such systems which are adapted for the transmission of visual and audible signals from the pilot-house or navigation bridge of a vessel to the engine room and vice versa, although of course it will be understood that it is not limited to use with systems of this type.

This application is a division of our application Serial No. 567,470, filed June 17, 1910, for improvements in electro-mechanical telegraph systems, wherein we have claimed the system *per se*.

One object of the present invention is to provide a receiver controlled electrically and actuated mechanically, whereby an order concerning the direction and speed of the engines, transmitted, for example, from the pilot-house to the engine-room, can be received visually, with an accompanying audible signal if desired.

Another object is to provide means whereby a printed record of the signals relating to the direction and speed of the engines, together with the time of the transmission of such signals, if desired, may be made both at the transmitting and receiving stations, as for example, the pilot-house and engine-room respectively.

A further object is to provide means whereby an audible and visual signal will be given when any one of the several spring motors employed requires re-winding.

Our invention will be particularly described by reference to the drawings which accompany and form a part of this specification and which illustrate one form of apparatus whereby the foregoing objects may be effected, together with one arrangement of circuits whereby said apparatus may be operated.

Figure 2:
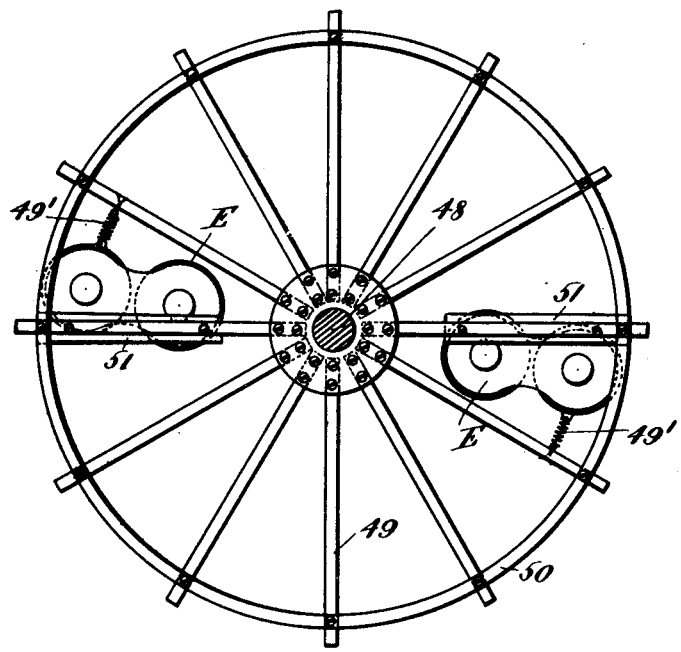
Figure 3:
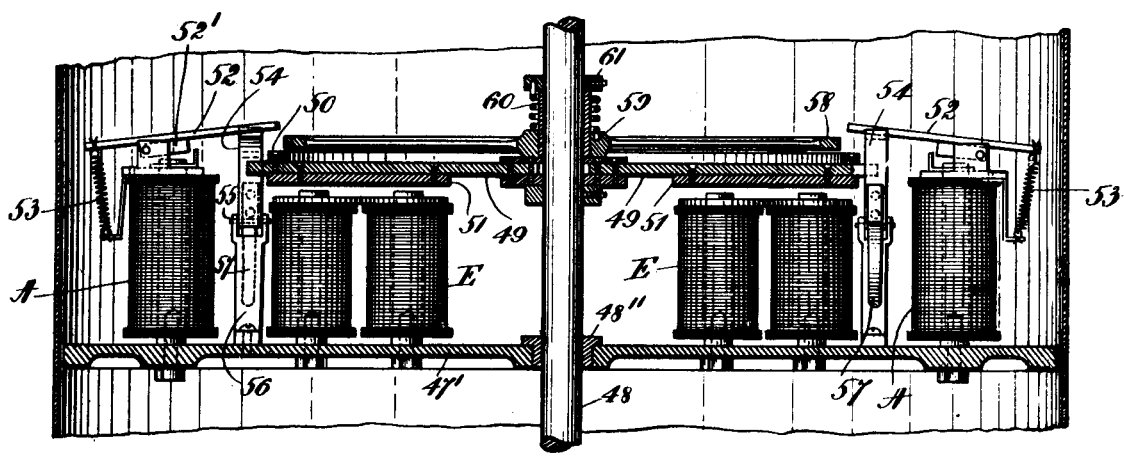
Figure 4:
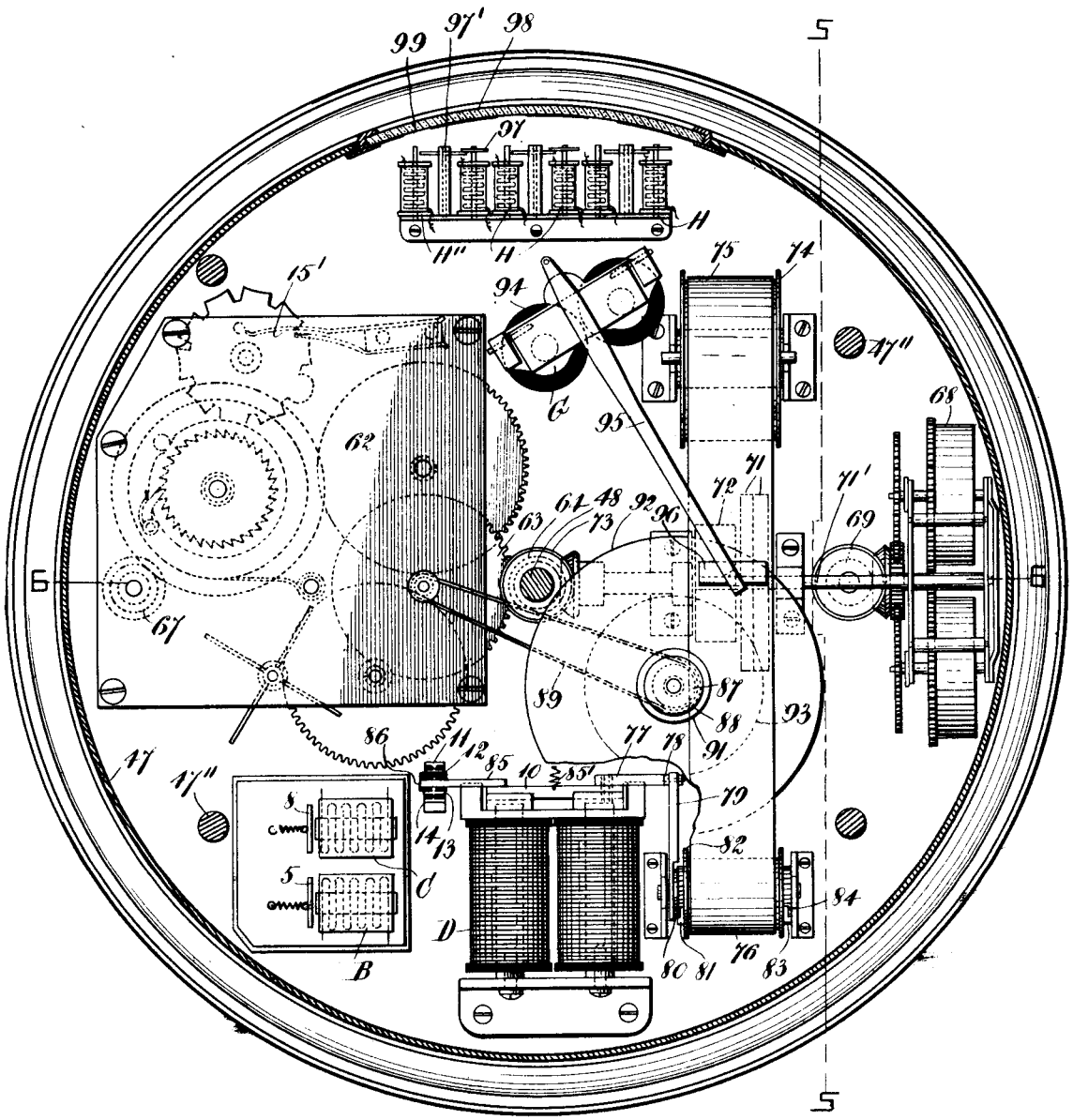
Figure 9:
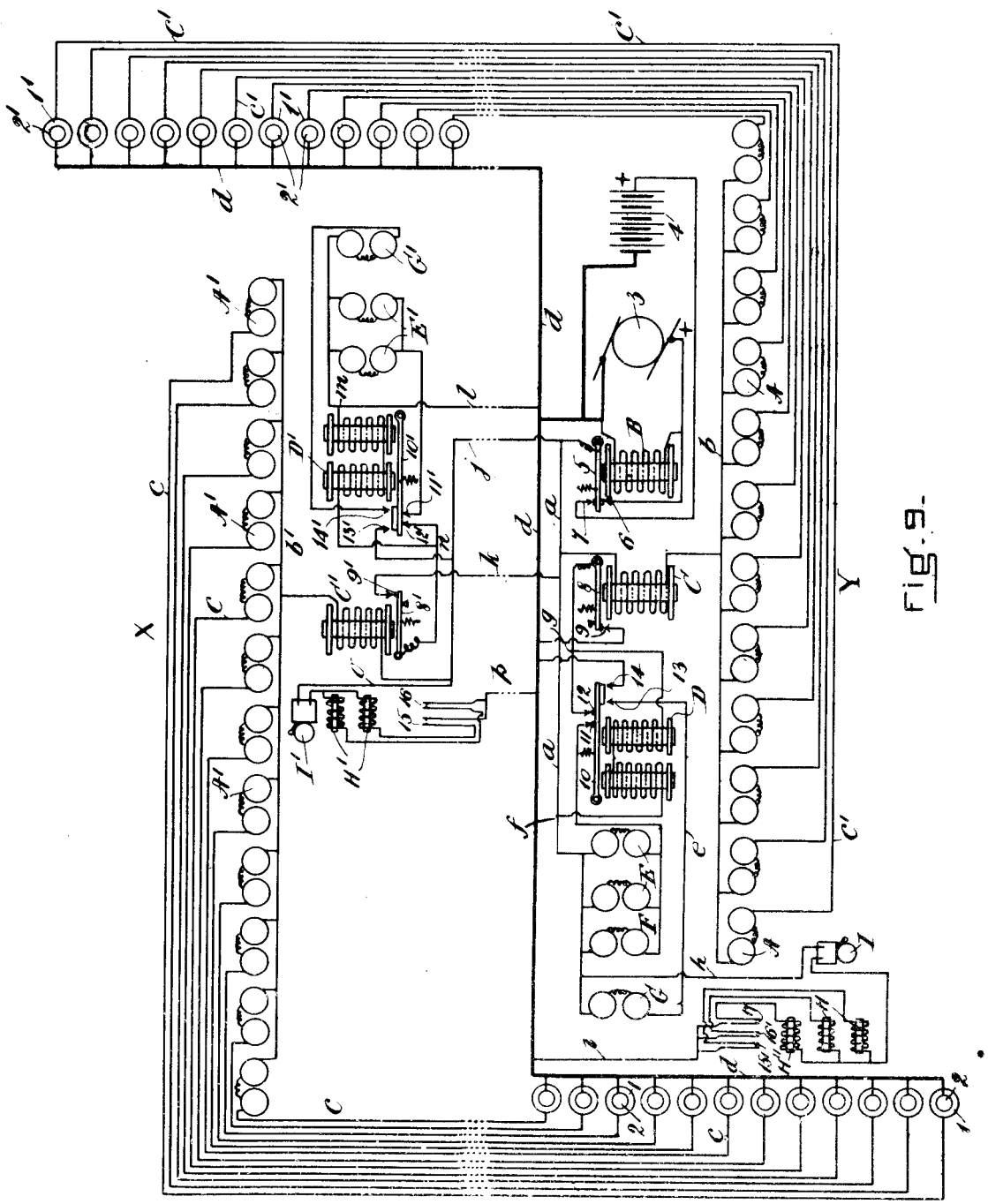

In the drawings, Figure 1 is a horizontal section taken on the line 1—1 of Fig. 5 showing the signal-selecting and signal-controlling mechanism in plan view. Fig. 2 is a plan view of the signal-controlling mechanism. Fig. 3 is a vertical section taken on the line 3—3 of Fig. 1, showing parts of the selecting and controlling mechanism in elevation. Fig. 4 is a horizontal section taken on the line 4—4 of Fig. 5. Fig. 5 is a vertical section taken on the line 5—5 of Fig. 4 with certain parts shown in elevation. Fig. 6 is an elevation of the complete receiving apparatus, certain parts being shown in a section taken on the line 6—6 of Fig. 4. Fig. 7 is an elevation of a portion of the receiving apparatus. Fig. 8 is an elevation of one of the signal-selecting or position-controlling magnets showing the latching mechanism. Fig. 9 is a diagram of one arrangement of circuits that may be employed.

In the particular drawings selected for illustrating our invention, 47 represents a casing secured to its base 101 and its cover 102 by moisture-proof joints 100, 100' and provided with a horizontal shelf 47' located about midway between the base and cover and supported from the base by the posts 47''. The central shaft 48, having its bearings at 48' in the base and 48'' in said shelf, supports the signal drum 65 which carries the signals relating to the direction and speed of the engine, said drum being secured to said shaft in any suitable manner, as by the collar 66, which is bolted to the drum and fixed to the shaft by a pin. The shaft and drum normally are at rest and by means of a spring or other motor, rotary motion may be imparted thereto for bringing one of said signals concerning the direction and speed of the engines opposite the window 65' in the casing, as shown in Fig. 6. In the present instance the gear-wheel 63 of the spring-motor 62 meshes with a pinion 64 carried by the central shaft to rotate the drum when the signal-controlling means is operated in the manner hereinafter set forth.

Electro-responsive signal-selecting means preferably are employed for the purpose of determining the position at which the signal-drum will stop after the signal-controlling means has been operated. While various forms of signal-selecting mechanism may be used, we prefer to employ the arrangement shown in Figs. 1 and 3. Secured to the shelf 47' and arranged concentrically with the central shaft are as many position-controlling or signal-selecting magnets A as there are signals to be transmitted. In the present instance twelve such magnets are shown, each having an armature 52' provided with a stop-lever 52, each stop-lever being normally held in elevated or inoperative position as shown in Fig. 3 by its spring 53. 58 is a stop-member, herein shown as a stop-wheel provided with the stop 62, with which each stop-lever 52 is arranged to coöperate when depressed into stopping-position by the energization of its magnet A. The stop-wheel is fixed relatively to the signal drum and is rotatable therewith, and preferably is secured, as shown, to the central shaft which carries said drum, by a resilient member whereby the shock caused by the sudden contact of the stop 62 with one of the stop-levers may be relieved. In the present instance the spiral spring 60 has its ends secured respectively to the hub 59 of the stop-wheel and to the collar 61, which is fast to the shaft. Signal-controlling means consisting in the present instance of the releasing-arms 49 connected by the rim 50, is rotatably secured to the central shaft immediately below the stop-wheel and one or more of said releasing-arms may be provided with armatures 51, 51 arranged to coöperate with the controlling magnets E E, which are attached to the shelf 47' to impart a rotary motion to said arms about said shaft. It will be understood, however that such rotary motion may be given to said releasing arms by any suitable electro-responsive device. The springs 49' secured to two of the arms 49, and the magnets E, normally hold the arms 49 against the stop-member 49" which may be a post rising from the shelf 47'. In front of each magnet A is a standard 56 having a latch 54 pivoted thereto at 55 and held normally in latching position by the plate spring 57. As shown most clearly in Fig. 8, the head of each latch is held by said spring slightly under the end of the stop-lever 52, so that when a magnet A is energized and the lever depressed, the latch will snap over the same and hold it in its depressed or stopping-position so that its outer end lies in the path of the stop 62. In their normal positions, when the magnets E E are not energized, the ends of the releasing arms are directly in front of the latches as shown in Figs. 1 and 3, and upon the energization of said magnets a rotary motion of a few degrees in a horizontal plane is imparted to said arms about the shaft 48 by the attraction of the armatures 51 to the magnets E so that each arm strikes its coöperating latch, thereby releasing that particular stop-lever 52 which happens at that time to be held down. The release of said stop-lever enables the spring-motor 62, or such other actuating means as may be employed, to rotate the shaft and signal-drum. We are aware that purely electrical marine telegraphs and purely mechanical marine telegraphs are old; but, so far as we are aware, it is broadly new with us to control or start the receiving apparatus of a marine telegraph system electrically and then operate the same mechanically. When the circuit of one of the magnets A is closed, its armature is attracted and its stop-lever 52 is held down in the path of the stop 62 by one of the latches 54, so that the rotation of the central shaft imparted by the spring-motor 62, as soon as the releasing mechanism releases the stop-lever which was previously held down, will bring said stop against that particular stop-lever which is associated with the energized magnet. This will cause the drum to exhibit behind the window 65' the signal selected by the apparatus which closed the circuit of the magnet A in question. It will be obvious that the controlling magnets E E must be energized only momentarily and that they must be so timed that the releasing arms are brought back to their normal positions before the circuit of the particular magnet A, which is energized for selecting a given signal, is opened. The particular means whereby the proper actuation of the magnets A and E is effected, will be hereinafter described in detail in connection with the diagram shown in Fig. 9.

It is highly desirable that a printed record be kept of the signals transmitted from the pilot house or bridge to the engine room and vice versa, together with the time of their transmission. In Figs. 4, 5 and 6 we have shown such recording apparatus. In these figures, 72 is a signal-type wheel carrying on its periphery type spelling out the signals which are printed on the signal drum. The type-wheel is rotated synchronously with the shaft 48 by any suitable means such as the miter gears 73, and is so arranged that when a given signal is exhibited at the window in the casing, the type which spell out the corresponding signal on the type-wheel are uppermost so as to coöperate with the hammer 96. 71 represents time-type wheels operated through the shaft 71' by any suitable clock-mechanism 68. A tape-wheel 74 journaled in a standard on the base 101 carries the tape 75 which passes between the carbon paper disk 92 and the hammer 96, so that when the latter strikes the tape against the carbon paper disk and type-wheels, an impression is made on the tape showing the signal which has been transmitted and the time of its transmission. The carbon paper disk 92 is supported by the stiff paper disk 93 and is clamped by the thumb-screw 91 to the stud 90 which has a bearing in the post 87. The stud is rotated in any suitable manner, as for example, by the belt 89 which passes around a pulley on the spring-motor and a pulley 88 on said stud. Various means may be employed to impart the necessary step-by-step motion to the tape 75 and in the present case we have shown the roller 76 provided with the operating ratchet 82 and the hold-back ratchet 83. The operating pawl 81 (see Fig. 4) is held by the wrist-plate 80 and the latter is pivoted to the arm 79 operated by the magnet D through the interposition of the vertical arm 78 and the horizontal arm 77, which in turn is secured to the armature 10 of said magnet. The hold-back pawl 84 (see Fig. 5) is secured to the standard in which the roller 76 is journaled and performs the usual function of preventing retrograde motion of said roller. The magnet G provided with the armature 94 operates the hammer which is carried on the arm 95.

As shown in Fig. 5, the receiving apparatus in the pilot house or navigation bridge is not necessarily provided with an audible signal, although such audible signal may if desired be used; but the receiving apparatus in the engine room preferably is provided with such audible signal. In the present instance, the audible signal consists, as shown in Fig. 6, of an electro-mechanical gong 116 of the usual well known construction mounted on the cover of the casing 47. The operating mechanism of this gong is carried in the base 114 thereof and the spring-motor of such mechanism may be wound by the usual stem extending up into the tube which is closed by the cap 115. This cap, like those shown at 67 and 69, for closing the orifices into which the winding mechanisms for the drum motor and clock-movement extend, preferably is constructed to make a moisture-proof joint.

It is desirable that means be provided for giving an alarm, either audible, visual, or both, when one of the several motors has almost run down. We prefer to employ an electric bell or audible run-down-alarm apparatus calling the operator's attention to the fact that one or more of the motors requires winding, together with an annunciator or run-down-indicator apparatus indicating the particular motor or motors which require attention. The audible alarm which is located outside the casing will be described in connection with Fig. 9. The visual indicators or annunciators are shown at H, H" (see Figs. 4, 5 and 7). The annunciator magnets H H are connected with suitable contacts on the drum-operating motor and the clock-movement, respectively, and the magnet H" is connected with similar contacts on the motor of the gong 116, if such gong is employed. The targets 97 are pivoted on the rods 97' and normally each has the position shown in Fig. 7. When one of the magnets is energized, the corresponding target swings over opposite the window 99 formed in the usual manner by painting the glass plate 98. After an indication has been given, the target may be returned to its normal position in any convenient way, or the annunciator may be so constructed that as soon as a magnet is deënergized by the opening of its circuit, the target is automatically restored. An example of the spring-motor-controlled contacts, which operate the annunciators above described when a motor requires winding, is shown at 15' in Fig. 4.

Referring now to Fig. 9, in which the several electrical elements above described are shown in diagram, X represents the terminal station in the pilot house or on the bridge and Y the terminal station in the engine room. 1 1' are the terminals of the conductors $c$ $c'$, respectively, each of which is connected to one terminal of the signal-selecting magnets A A', which have their other terminals connected by the conductors $b$ $b'$ respectively. 2 2' represent the terminals of leads from the common return, conductor $d$. Bridging one of the sets of terminals 1' 2' at the pilot house will close the circuit through one of the magnets A in the engine room in the following manner: from the positive terminal of the direct-current source 3 to the front-contact 6 of the current-source-control relay B, which controls the particular current source employed, to the armature 5 thereof, and thence by conductor $a$ to the secondary-circuit-control relay C, which controls the secondary circuit, then by way of the conductor $b$ to one of the magnets A, thence by way of one of the conductors $c'$ to one of the sets of contact terminals 1' 2', and back to the other terminal of the source 3 by the common return conductor $d$. Bridging one of the sets of terminals 1, 2, in the engine room, will close the circuit through one of the magnets A' at the pilot house in the following manner: from the positive terminal of the source 3 to the front-contact 6, armature 5, conductor $j$, relay C', conductor $b'$, through one of the magnets A', and thence through one of the conductors $c$ to the particular set of contacts 1, 2, which are bridged, and thence back to the source by way of the return wire $d$. The circuits which have just been traced are termed the primary circuits. The closure of one of said circuits and the consequent energization of the relay C, will effect the closure of the secondary circuit $a$ E E F 11, 10, 12, 8, 9 which is connected in shunt to the primary circuit and which includes the controlling magnets E, and magnet F for operating the electro-mechanical gong 116. A tertiary circuit $f$ D $g$, connected in shunt to said secondary circuit, includes the magnet D, which is a relay controlling the sequence of operation of the magnets E, F, and G, and which also operates the mechanism for giving a step-by-step movement to the tape 75. A fourth circuit $a$ G $e$ 13, 14, also connected in shunt to the primary circuit, includes the recording-apparatus-actuating magnet G which operates the hammer 96. The energization of the relay C in the engine room will momentarily close the circuits of the magnets E, F, thereby operating the signal-controlling mechanism shown in Figs. 5, 6 and 7, and the electro-mechanical gong 116, as follows : from the positive terminal of the source 3, to the front-contact 6, armature 5, conductor $a$, through the magnets E and the magnet F to contact 11, armature 10 of relay D, contact 12 (the armature 10 normally being spring-held against said contacts 11 and 12) to armature 8 of relay C, front-contact 9, and thence back to the other terminal of the source by way of the common return conductor $d$. The relay D is so timed that immediately after the closure of the circuits just traced through E and F, the armature 10 is attracted, thereby breaking said circuits. The circuit through the relay D may be traced from the positive terminal of the source 3 to the front-contact 6, armature 5, conductor $a$, point $f$, winding of the relay, point $g$, armature 8, front-contact 9, and thence back to the other terminal of said source by way of the common return conductor $d$. The energization of said relay D will open the circuits of the magnets E and F at the contacts 11, 12 and will close the circuit through the recording-apparatus-actuating magnet G as follows: from the positive terminal of the source 3, to the front-contact 6, armature 5, conductor $a$, magnet G, to the back-contacts 13, 14, which are now bridged by a metallic strip secured to and insulated from the armature 10, thence back to the other terminal of the source by way of the common return conductor $d$. As soon as the mechanism employed to bridge one of the sets of terminals 1' 2' is released and the secondary-circuit-control relay C thereby deënergized, the armature 8 is thrown over to its back contact, thereby breaking the circuit through the relay D, and the various apparatus resume their normal positions, except of course the stop-lever 52 associated with that particular magnet A which was energized by bridging said terminals, such stop-lever being held in its operative position by its latch 54. When one of the terminals 1, 2 in the engine room is bridged and the secondary-circuit-control relay C' in the pilot house is energized, the relay D' at the pilot house closes the secondary circuits through the signal-controlling magnets E' and the recording-apparatus-actuating magnet G' as follows: from the positive terminal of the source 3 to the front-contact 6, armature 5, conductors $a$ and $k$, front-contact 9' of relay C', armature 8', contact 12', armature 10' contact 11', (the armature 10' normally being spring-held against contacts 11' 12') magnets E', conductor $l$, thence back to the other terminal of said source by the common return wire $d$. Immediately after the energization of said magnets E' and the resulting operation of the releasing mechanism 49, 50, above referred to, the relay D' is energized by current taking the following path: from the positive terminal of the source 3 to the front-contact 6, armature 5, conductors $a$ and $k$, contact 9', armature 8', point $n$, through the windings of said relay to point $m$, conductor $l$, thence back to the other terminal of the source by way of the common return wire $d$. The energization of the relay D' will open the circuit of the magnets E', at the contacts 11', 12' and will close the circuit of the recording-apparatus-actuating magnet G' as follows: from the positive terminal of the source 3 to the front-contact 6, armature 5, conductor $j$, contacts 13' 14', which are bridged by a metallic strip secured to, but insulated from, the armature 10', through the windings of said magnet to point $m$, conductor $l$, and thence back to the other terminal of the source by way of the common return wire $d$. As soon as the primary circuit is opened in the engine room, the relay C' at the pilot house is deënergized and the other circuits are cleared in the manner above set forth in connection with those in the engine room.

It will be understood from the foregoing that as soon as a primary circuit is closed, one of the stop-levers 52 is brought down into operative or wheel-stopping position with its end extending into the path of the stop 62 on the wheel 58 and that it is held in such position by the spring-pressed latch 54. Immediately afterward, the energization of the secondary-circuit-control relay C or C' will actuate the signal-controlling mechanism so that the arms 49 will strike all the latches, including the one associated with the magnet A or A' which has just been energized, as well as the one associated with the magnet A or A' which was energized for the transmission of the signal last transmitted. The stop-lever associated with the magnet which was energized for the transmission of the signal last transmitted will of course rise to its normal position, its magnet now being deënergized, but the stop-lever actuated by the magnet which has just been energized for the transmission of the new signal will remain down, and when the releasing magnets are deënergized and the springs 49' retract the arms 49 to their normal position, the last mentioned stop-lever will remain down with its end in the path of the stop 62 for the purpose of arresting the rotation of the signal drum at the proper point. In other words, a primary circuit must remain closed until after the deënergization of the signal-controlling magnets E, and the latter, as well as the relay C, preferably should be quick-acting magnets, while the relay D should be somewhat sluggish in action for the double purpose of enabling the releasing magnet E to act before the circuit of the latter is broken at the contacts 11, 12, and also enabling the signal drum and its synchronously rotating signal-type-wheel 72 to arrive at their proper positions before its complete energization which effects the closure of the circuit of the recording-apparatus-actuating magnet G at the contacts 13, 14.

It will be understood that the arrangement represented in Fig. 9 for closing the circuits which include the contacts 11, 12 and 13, 14, respectively, is purely diagrammatic and that our preferred mode of controlling said circuits is shown in Figs. 4 and 5. The spring-members 11, 12 are normally held in contact by the upright extension 86 of the arm 85, which is secured to the armature 10 of the magnet D, the spiral spring 85' normally holding said armature away from its core. As soon as the relay D is energized and the armature 10 is attracted, the said extension 86 presses the spring-contacts 13, 14 into contact and allows the spring contacts 11 and 12 to separate. However, as will be readily understood, various other equivalent arrangements can be employed for this purpose.

The source 3 referred to, which may be any suitable form of dynamo-electric machine, is connected in series with the current-supply-control relay B, a shunt circuit connecting one pole thereof, herein shown as the positive pole, to the front contact 6 of said relay. When the said source 3 is in operation, the relay B is energized and the armature 5 is held against said front-contact, so that as above described, the various magnets and relays are energized by current flowing from said positive pole by way of said front-contact and armature. If for any reason the generator 3 should be shut down, the resulting deënergization of the relay B will allow the armature 5 to fall forward against the back contact 7, whereupon current will flow to the several relays and magnets from the positive terminal of the storage or other battery 4 by way of said back contact 7 and armature 5.

The contacts for the run-down-alarm apparatus I' at the pilot house are shown at 15, 16, and those for the run-down-alarm apparatus I in the engine room are shown at 15' 16' and 17. It will be obvious that when any of the pairs of contacts are closed, a continuous alarm will be given by I or I' and that one of the annunciator magnets H H' or H'' will be energized, thereby throwing its target 97 in front of one of the windows 99 (see Fig. 7) so that the attendant will know which one of the several spring-motors or clock-movements requires winding. The circuits through the said alarms and annunciators may be traced as follows: from the positive terminal of the source 3 to the front-contact 6, armature 5, conductors a and j, through the windings of the alarm I' and thence back to the other terminal of said source through the winding of one of the magnets H', one of the pairs of contacts 15 or 16, conductor p, and common return conductor d; and from the positive pole of the source 3 to the front-contact 6, armature 5, conductors a and h, through the winding of the alarm I and thence back to the other terminal of said source through the winding of one of the magnets H or the winding of the magnet H'' one of the pairs of contacts 15' 16' or 17, conductor i and common return conductor d.

Inasmuch as the electro-mechanical gong 116 may be, and preferably is, omitted from the apparatus in the pilot house or on the bridge (as shown in Fig. 5) the diagram of circuits at station X shows no magnet corresponding to the magnet F, annunciator corresponding to the annunciator H'', or contacts corresponding to the pair of contacts 17.

One type of transmitter whereby the primary circuits may be closed at the points 1, 2, 1', 2', is claimed in co-pending application Serial No. 708,649, filed on even date herewith.

We do not wish to limit ourselves to the exact mechanism or circuit arrangements hereinbefore described, inasmuch as it is obvious that many modifications may be made, both in the apparatus and in the circuits connecting the same, without departing from the principle of our invention.

We claim:

1. In a telegraph system, a visual-signal apparatus comprising a rotatable signal-drum, a shaft carrying the same, and signal-selecting apparatus, said signal-selecting apparatus comprising a stop-member fixed relatively to said drum and rotatable therewith, a plurality of signal-selecting magnets, a plurality of stop-levers, each arranged to be actuated by a different one of said magnets to coöperate with said stop-member, and means for holding each stop-lever in stopping position.

2. In a telegraph system, a visual-signal apparatus comprising a rotatable signal-drum, a shaft carrying the same, and signal-selecting apparatus, said signal-selecting apparatus comprising a stop-member, a shock-absorbing member securing said stop-member to rotate with said drum, a plurality of signal-selecting magnets, a plurality of stop-levers, each arranged to be actuated by a different one of said magnets to coöperate with said stop-member, and means for holding each stop-lever in stopping position.

3. In a telegraph system, a visual-signal apparatus comprising a rotatable signal-drum, a shaft carrying the same, and signal-selecting apparatus, said signal-selecting apparatus comprising a stop-member secured to said shaft, a plurality of signal-selecting magnets, a plurality of stop-levers, each arranged to be actuated by a different one of said magnets to coöperate with said stop-member and means for holding each stop-lever in stopping position.

4. In a telegraph system, a visual-signal apparatus comprising a rotatable signal-drum, a shaft carrying the same and signal-selecting apparatus, said signal-selecting apparatus comprising a stop-member, resilient means securing said stop-member to said shaft, a plurality of signal-selecting magnets, a plurality of stop-levers, each arranged to be actuated by a different one of said magnets to coöperate with said stop-member, and means for holding each stop-lever in stopping position.

5. In a telegraph system, a visual-signal apparatus comprising a rotatable signal-drum, a shaft carrying the same, and signal-selecting apparatus, said signal-selecting apparatus comprising a stop-member, a shock-absorbing member securing said stop-member to rotate with said drum, a plurality of signal-selecting magnets, a plurality of stop-levers, each arranged to be actuated by a different one of said magnets to coöperate with said stop-member, and means for holding each stop-lever in stopping-position.

6. In a telegraph system, a visual-signal apparatus comprising a rotatable signal-drum, a shaft carrying the same and signal-selecting apparatus, said signal-selecting apparatus comprising a stop-member, resilient means securing said stop-member to said shaft, a plurality of signal-selecting magnets, a plurality of stop-levers, each arranged to be actuated by a different one of said magnets to coöperate with said stop-member, and means for holding each stop-lever in stopping-position.

7. In a telegraph system, a visual-signal apparatus comprising a rotatable signal-drum, a shaft carrying the same, and signal-selecting apparatus, said signal-selecting apparatus comprising a stop-member fixed relatively to said drum and rotatable therewith, a plurality of signal-selecting magnets, a plurality of stop-levers, each arranged to be actuated by a different one of said magnets to coöperate with said stop-member, and latching means for holding each stop-lever in stopping-position.

8. In a telegraph system, a visual-signal apparatus comprising a rotatable signal-drum, a shaft carrying the same and signal-selecting apparatus, said signal-selecting apparatus comprising a stop-member fixed relatively to said drum and rotatable therewith, a plurality of signal-selecting magnets, a plurality of stop-levers, each arranged to be actuated by a different one of said magnets to coöperate with said stop-member, means for holding each stop-lever in stopping-position, and signal-controlling means for releasing said stop-levers.

9. In a telegraph system, a visual-signal apparatus comprising a rotatable signal-drum, a shaft carrying the same and signal-selecting apparatus, said signal-selecting apparatus comprising a stop-member fixed relatively to said drum and rotatable therewith, a plurality of signal selecting magnets, a plurality of stop-levers, each arranged to be actuated by a different one of said magnets to coöperate with said stop-member, means for holding each stop-lever in stopping position, and electro-responsive means for releasing said stop-levers.

10. In a telegraph system, a visual-signal apparatus comprising a rotatable signal-drum, a shaft carrying the same and signal-selecting apparatus, said signal-selecting apparatus comprising a stop-member fixed relatively to said drum and rotatable therewith, a plurality of signal-selecting magnets, a plurality of stop-levers, each arranged to be actuated by a different one of said magnets to coöperate with said stop-member, means for holding each stop-lever in stopping-position, signal-controlling means for releasing said stop-levers, and means whereby said signal-controlling means is caused to operate after a signal-selecting magnet.

11. In a telegraph system, a visual-signal apparatus comprising a rotatable signal-drum, a shaft carrying the same, signal-selecting apparatus, said signal-selecting apparatus comprising a stop-member fixed relatively to said drum and rotatable therewith, a plurality of signal-selecting magnets, a plurality of stop-levers, each arranged to be actuated by a different one of said magnets to coöperate with said stop-member, latching-means for holding each stop-lever in stopping position, signal-controlling means for releasing said stop-levers, said signal-controlling means comprising a plurality of radially-extending releasing-arms rotatably mounted on said shaft and each arranged to coöperate with a different one of said latching means, and electro-responsive means for imparting a rotary movement to said releasing-arms.

12. In a telegraph system, a visual signal apparatus comprising a rotatable signal-drum, a shaft carrying the same, signal-selecting apparatus comprising a plurality of electromagnets each having an armature for normally locking said shaft against rotation, another electromagnet for releasing said shaft, and mechanical means for rotating said shaft.

13. In a telegraph system, a visual signal apparatus comprising a signal drum rotatable in one direction only, signal-selecting apparatus comprising an electromagnet having an armature for normally locking said drum against rotation, a second electromagnet for releasing said drum, and mechanical means for rotating the same.

14. In a telegraph-system, a visual-signal apparatus comprising a rotatable signal-drum, a shaft carrying the same, and signal-selecting apparatus, said signal-selecting apparatus comprising a stop-member fixed relatively to said drum and rotatable therewith, a plurality of signal-selecting magnets, a plurality of stop-levers, each arranged to be actuated by a different one of said magnets to coöperate with said stop-member, means for holding each stop-lever in stopping position and a shock-absorbing member interposed between said stop-member and shaft.

In testimony whereof, we have hereunto subscribed our names this 5th day of July, 1912.

WALTER K. QUEEN.
THORNTON F. PICKETT.

Witnesses:
GEO. K. WOODWORTH,
E. B. TOMLINSON.